United States Patent [19]

Belhomme

[11] Patent Number: 5,217,157
[45] Date of Patent: Jun. 8, 1993

[54] METHOD OF SECURING A CONDUCTOR TO A CERAMIC PTC

[75] Inventor: Charles J. G. Belhomme, Brussels, Belgium

[73] Assignee: U.S. Philips Corporation, New York, N.Y.

[21] Appl. No.: 926,577

[22] Filed: Aug. 6, 1992

[30] Foreign Application Priority Data

Sep. 17, 1991 [EP] European Pat. Off. ........ 91202382.7

[51] Int. Cl.⁵ .............................................. B23K 1/20
[52] U.S. Cl. ..................................... 228/223; 148/23; 228/122
[58] Field of Search ............... 228/122, 123, 124, 223, 228/224; 148/23, 24

[56] References Cited

U.S. PATENT DOCUMENTS

| | | | |
|---|---|---|---|
| 4,342,606 | 8/1982 | Notton | 228/248 X |
| 4,738,732 | 4/1988 | Anderson et al. | 148/23 |
| 4,895,606 | 1/1990 | Jafri | 148/24 X |

*Primary Examiner*—Kenneth J. Ramsey
*Attorney, Agent, or Firm*—Robert J. Kraus

[57] ABSTRACT

The invention provides a method of soldering a conductor on to a ceramic resistor body having a positive temperature coefficient, said method employing a soldering flux which is free of organic compounds having a high molecular weight. Preferably, the soldering flux comprises an aqueous solution of zinc chloride and hydrazine hydrochloride. The inventive method reduces the risk of explosion of soldered PTCs.

4 Claims, 1 Drawing Sheet

METHOD OF SECURING A CONDUCTOR TO A CERAMIC PTC

BACKGROUND OF THE INVENTION

The invention relates to a method of soldering a conductor on to a ceramic resistor body having a positive temperature coefficient.

Ceramic resistor bodies having a positive temperature coefficient are often abbreviated to PTC. Such PTCs are used predominantly as self-regulating heating elements. This type of PTCs generally consists of a sintered material of predominantly barium titanate which is doped with, for example, a rare earth metal (such as lanthanum), niobium, antimony and/or bismuth. Said dopants provide the sintered resistance material with a semiconducting character.

A sintered material of the above composition exhibits an electrical resistance characteristic which is typical of PTCs. When the resistance is determined as a function of temperature, said resistance is found to increase substantially at a temperature near the so-called Curie temperature of the PTC material. In a graph showing the electrical resistance as a function of temperature, this effect results in a typical S-curve. In the range of the Curie temperature a relatively small temperature increase leads to a relatively large increase in resistance. As the heat conduction of the sintered material is relatively low, this situation is attained at a relatively low electric power. The relatively large increase of the resistance at a temperature near the Curie temperature sets a practical upper limit to the power which can be stored in the PTC and dissipated as heat.

The Curie temperature of barium titanate can be influenced in a simple manner by partly replacing barium by strontium or lead. The replacement of a part of the barium by strontium or lead brings about an increase or a decrease, respectively, of the Curie temperature.

The known PTCs usually comprise two conductors for effecting the supply of electric power. Said conductors are customarily soldered on to the ceramic PTC body. To this end, the ceramic body is provided with two metallic contact layers. Said layers may be provided in various manners such as, for example, by vacuum evaporation or sputtering. The contact layers may alternatively be provided by means of screen printing. In that case, a thin layer of conductive paste is screen printed on the ceramic body and is subsequently annealed. In this manner, an electrically conductive layer is formed. After the contact layers have been provided, the conductors are soldered on to said layers.

Conductors are to be understood to mean, first of all, electrically conductive metallic connection wires of, for example, copper or a copper alloy. However, conductors are to be understood to mean also electrically conductive tracks of a so-called printed circuit board (PCB).

Applicants have found that the conventional soldering methods used for securing a conductor to a PTC are not optimal. More in particular it has been found that the ceramic material of PTC's which were provided with connections in the conventional manner may explode. Said explosions of the ceramic material occur, in particular, when the known PTC's are subjected to high-voltage tests at voltages of from 200 Volts. Under said conditions, also indications of a short-circuit in said PTC's were observed.

SUMMARY OF THE INVENTION

It is an object of the invention to overcome the above-mentioned drawbacks. The invention more particularly aims at providing a method of soldering a conductor on to a PTC in such a manner that the finished product constitutes no explosion hazard. In addition, the products thus manufactured must not exhibit indications of a short-circuit.

Such object is achieved by a method of soldering a conductor on to a ceramic resistor body having a positive temperature coefficient, which method is characterized according to the invention in that during soldering a soldering flux is used which is free of organic compounds having a high molecular weight.

Soldering fluxes are used to improve the moistening between the solder and the parts to be soldered. It has been found that the risk of explosion of the conventionally manufactured PTCs can be ascribed to the soldering technique employed. The fluxes used up to now were always liquids comprising high-molecular organic compounds. During soldering, said compounds may diffuse into the ceramic material of the PTC and disturb the oxygen balance of the ceramic material through reduction and/or oxidation. Owing thereto, such a PTC may explode when it is subjected to a relatively high electric load. Soldering fluxes which are free of high-molecular organic compounds do not cause the above-mentioned adverse phenomenon. Organic compounds having a high molecular weight are to be understood to mean herein, carbon-containing compounds the molecular weight of which exceeds 100.

A preferred embodiment of the method according to the invention is characterized in that the soldering flux comprises an aqueous solution of zinc chloride and hydrazine hydrochloride. The soldering flux preferably comprises 0.2–5 wt. % of zinc chloride and 0.5–5 wt. % of hydrazine hydrochloride.

A further preferred embodiment of the invention provides a method which is characterized in that the flux is dried before the conductor is soldered to the ceramic body having positive temperature coefficient.

BRIEF DESCRIPTION OF THE DRAWING

Aspects of the invention will be explained in greater detail by means of exemplary embodiments and the accompanying drawing, in which.

DESCRIPTION OF THE PREFERRED EMBODIMENTS

Figure 1:
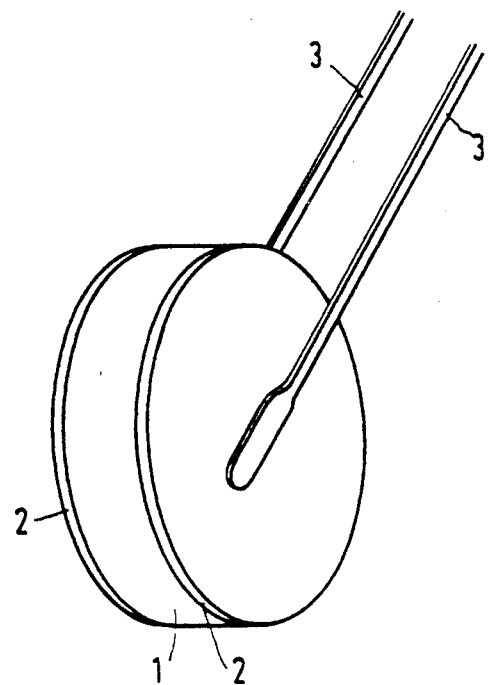
FIG. 1 shows a ceramic resistor body having a positive temperature coefficient, to which body two conductors in the form of connection wires are soldered according to the method of the invention.

FIG. 1 shows a ceramic resistor body 1 having a positive temperature coefficient, which is constructed as a cylindrical disc having a radial section of 1.2 cm and a thickness of 0.4 cm. The resistor body consists of substantially pure barium titanate which is doped with 0.003 wt. % of lanthanum. A contact layer 2 is provided on the two flat sides of the disc by means of vacuum evaporation. Said contact layer consists of a first sublayer of a NiCr alloy (thickness 0.1 micron) and a second sublayer of Ag (thickness 0.3 micron) which is provided thereon.

A connection wire 3 is attached to both contact layers 2 of PTC 1. Said wires are made of copper. The wire ends to be soldered are provided with a layer of solder (PbSn) by immersing them in a solder bath. After the solder had cooled to room temperature said ends were immersed in a bath containing soldering flux which was free of organic compounds having a high molecular weight. In the present case, the soldering flux consisted of a solution of water and alcohol (50 vol. % each) to which 1 wt. % of zinc chloride and 0.8 wt. % of hydrazine hydrochloride were added. After the soldering flux had dried the connection wires were soldered on to the PTC by pressing the wires against the contact layers at an increased temperature.

A batch of the above-mentioned PTCs was compared to a batch of PTCs which were manufactured in the conventional manner. In the case of the latter batch of PTCs a soldering flux comprising high-molecular organic compounds was used for soldering the connection wires on to the contact layers. Both batches were subjected to a test in which an electric voltage of 600 Volts was applied across the connection wires of the PTCs for 15 minutes. In the first-mentioned batch no PTCs exploded. In the last-mentioned batch some of the examined PTCs exploded under these conditions. Besides, in the first batch the electrical characteristics of the PTCs were substantially unchanged. The electrical characteristics of the second batch were found to have deteriorated substantially after the soldering step.

Figure 2:
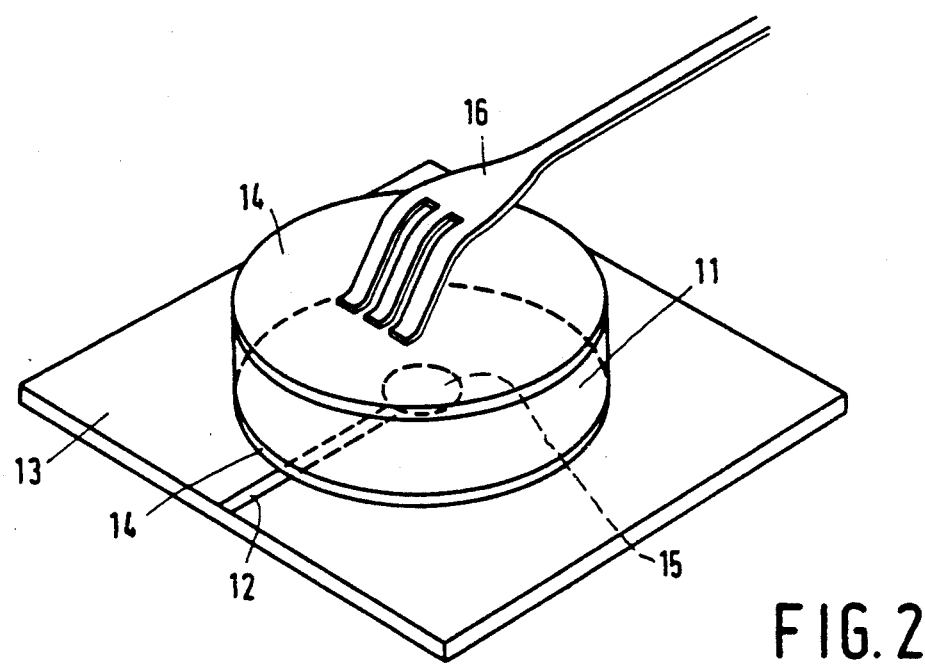
FIG. 2 shows a ceramic resistor body having a positive temperature coefficient, which body is secured to a PCB according to the method of the invention.

FIG. 2 shows a ceramic resistor body having a positive temperature coefficient 11, which is soldered on to a conductor 12 which forms part of a ceramic substrate 13 of aluminium oxide (96%). The cylindrical resistor body consists of sintered barium-lead-titanate which is doped with 0.003 wt. % of lanthanum. Metallic contact layers 14 are provided on the flat sides of the PTC 11 by means of vacuum evaporation. Said layer consists of a first sublayer of a NiCr alloy (thickness 0.1 micron) to which a second sublayer of Ag (thickness 0.3 micron) was applied.

Substrate 13 comprises a metallic conductor 12 in the form of an electrically conductive track which is provided thereon by means of screen printing. The end portion 15 of track 12 is tin-plated. Before PTC 11 was soldered on to the substrate 13, the tin-plated end portion 15 was covered with a soldering flux which contained no high-molecular organic compounds. In the present case, the soldering flux consisted of a solution of water and alcohol (50 vol. % each) to which 1 wt. % of zinc chloride and 0.8 wt. % of hydrazine hydrochloride were added. After the solvents had been removed from the soldering flux (water and alcohol) by means of blow drying, PTC 11 was clamped on the substrate at the location of the tin-plated end portion 15. Subsequently, the PTC was soldered on to the substrate by heating the assembly to a temperature above the melting temperature of the solder. Finally, a second conductor in the form of a contact spring 16 was clamped on the other contact layer. Said contact spring was further clamped in a housing (not shown) in which the substrate with the PTC were secured.

Further tests have shown that a soldering flux which contains only $ZnCl_2$ or hydrazine hydrochloride does not meet the requirements, irrespective of the percentage of said substances in the solvent.

I claim:

1. A method of soldering a conductor on to a ceramic resistor body having a positive temperature coefficient, characterized in that during soldering a soldering flux is used which is free of organic compounds having a high molecular weight.

2. A method as claimed in claim 1, characterized in that the soldering flux comprises an aqueous solution of zinc chloride and hydrazine hydrochloride.

3. A method as claimed in claim 2, characterized in that the soldering flux comprises 0.2-5 wt. % of zinc chloride and 0.5-5 wt. % of hydrazine hydrochloride.

4. A method as claimed in claim 3, characterized in that the flux is dried before the conductor is soldered on to the ceramic body having positive temperature coefficient.

* * * * *